UNITED STATES PATENT OFFICE.

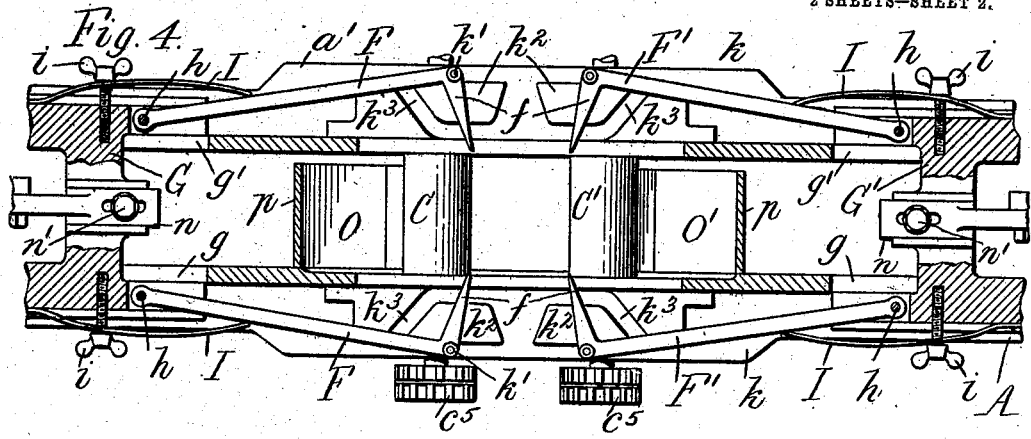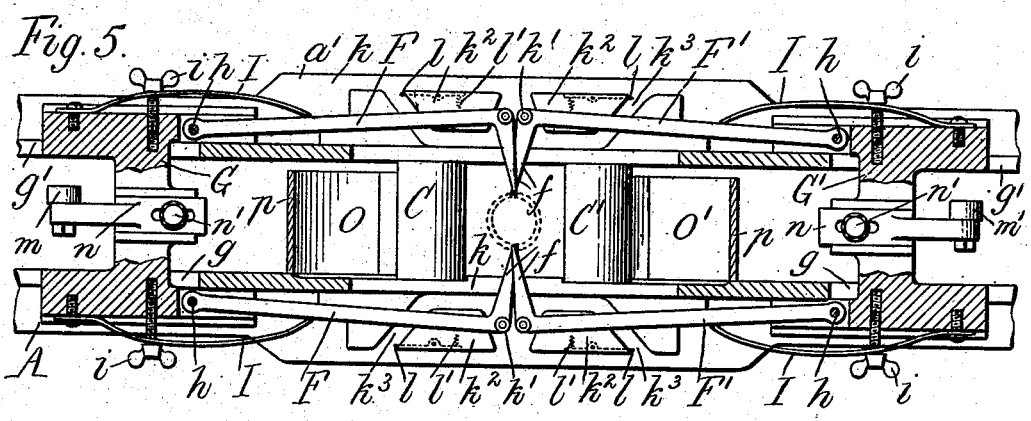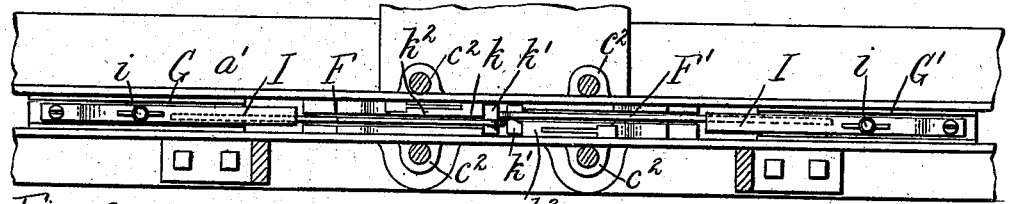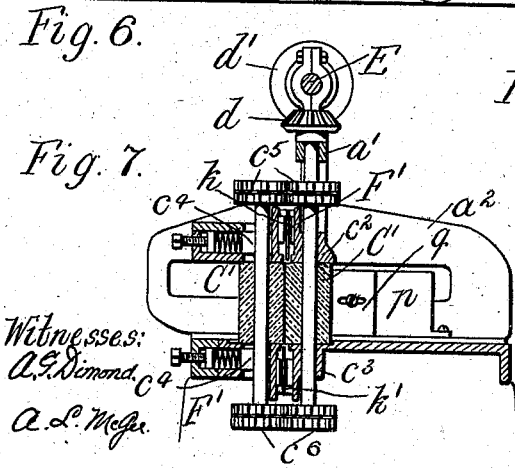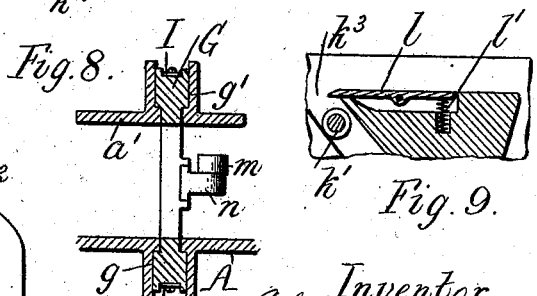

JOHN F. WHITE, OF MOUNT MORRIS, NEW YORK.

CORN-HUSKING MACHINE.

No. 899,777.　　　　Specification of Letters Patent.　　　Patented Sept. 29, 1908.

Application filed September 8, 1906. Serial No. 333,790.

*To all whom it may concern:*

Be it known that I, JOHN F. WHITE, a citizen of the United States, residing at Mount Morris, in the county of Livingston and State of New York, have invented a new and useful Improvement in Corn-Husking Machines, of which the following is a specification.

This invention relates to machines for husking green corn, and the primary object of the invention is to produce an efficient machine of simple, durable and inexpensive construction which will rapidly and thoroughly strip the husks from the ears without materially bruising the corn.

Briefly stated, the machine is organized and operates as follows: Husking rolls are provided arranged in pairs with a space between the pairs of rolls into which space the ears of corn are fed singly, tassel end foremost. A holder or support properly directs the ear and assists in supporting the same, while the husks at the forward or tassel end of the ear are divided and dragged or pulled in opposite directions, a portion into the bite of each pair of husking rolls by stripping tongs or devices having fingers or prongs which move in directions so that they engage the husks and drag them toward the two pairs of husking rolls. The pairs of rolls are driven in opposite directions so that they strip the husks in opposite directions from the ear, and by this action feed or move the ear forwardly endwise through the space between the pairs of rolls in a direction crosswise of the rolls. The rolls completely tear the husks from the ear, which is thus freed and drops from between the pairs of rolls while the husks are fed laterally in opposite directions by the two pairs of rolls and discharged from the machine.

Figure 1:
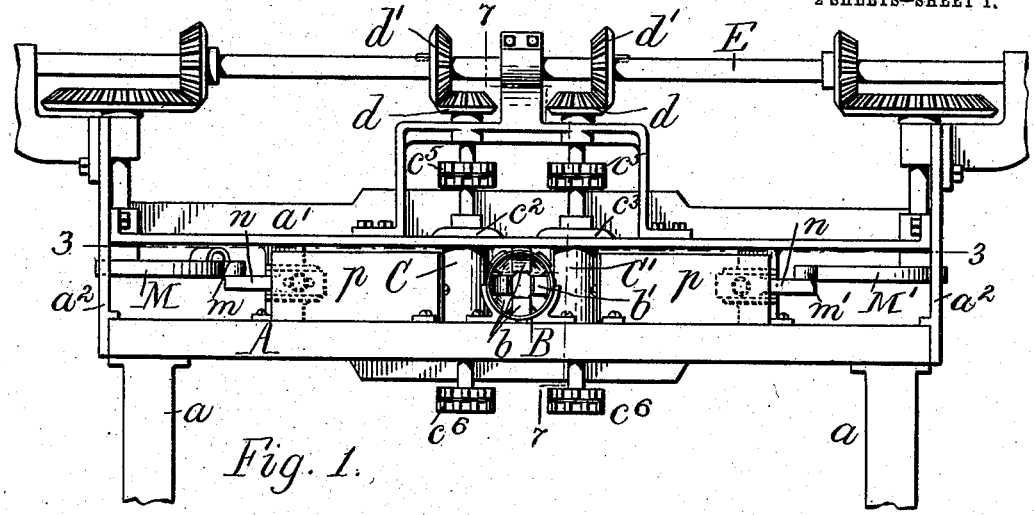
Figure 2:
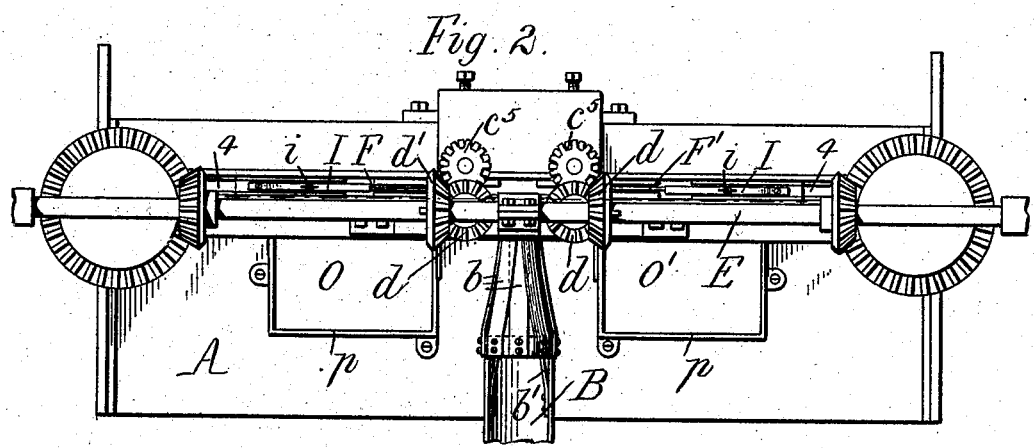
Figure 3:
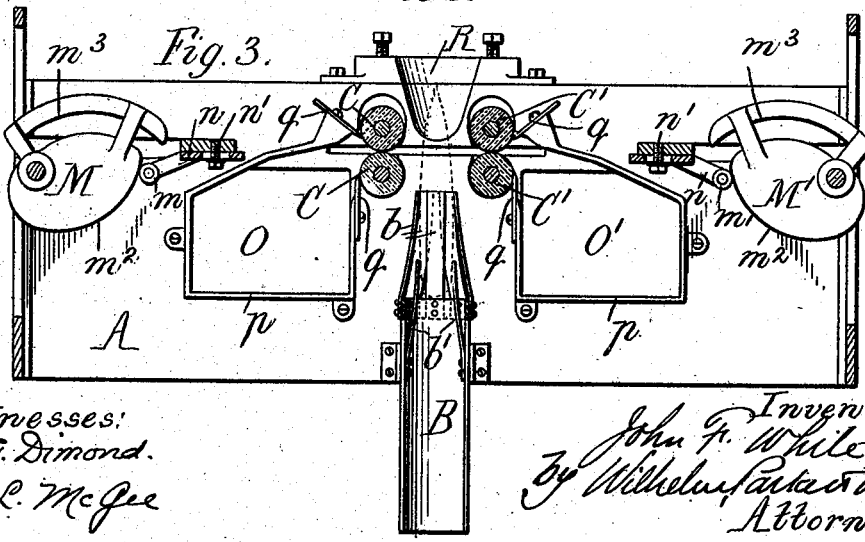

In the accompanying drawings, consisting of two sheets: Figure 1 is a front elevation of a corn husking machine embodying the invention. Fig. 2 is a plan view thereof. Fig. 3 is a horizontal sectional plan thereof in line 3—3, Fig. 1. Fig. 4 is an enlarged transverse sectional elevation of the stripping tongs and their operating means, in line 4—4, Fig. 2. Fig. 5 is a similar view, showing the parts in different position. Fig. 6 is a plan view, partly in section, of the parts shown in Fig. 5. Fig. 7 is a sectional elevation of one pair of husking rolls and their drive means, in line 7—7, Fig. 2. Fig. 8 is a detail cross section of one of the reciprocating tong slides and the guides therefor. Fig. 9 is a detail section of one of the switches for the stripping tongs.

Like letters of reference refer to like parts in the several figures.

The main frame of the machine shown in the drawings consists of a horizontal bed or table A supported by suitable legs $a$, and a bearing yoke $a'$ supported above the table by end uprights $a^2$, but the main frame may be of any other suitable construction.

B represents a holder or support into which the ears of corn are fed singly by hand (or, if desired, by a feed mechanism which forms no part of this invention and is not shown in the drawings) and which holds the ear in position for husking. The ear holder preferably consists of an open top trough provided at its rear end with an expansible funnel portion $b$ formed by a circular series of converging spring strips. After the ear is dropped or placed in the trough it is shoved endwise rearwardly in the funnel by which it will be held with its tip end projecting therefrom, as shown by dotted lines in Fig. 3. The holder is also preferably provided with spring strips $b'$ extending into the funnel which grasp the butt-end of the ear and hold the ear from swinging sidewise in the holder during the husking operation. Any other suitable device for holding the ear could be employed.

C C and C' C' represent two pairs of husking rolls which are arranged in rear of the ear holder and at opposite sides thereof, the pairs of rolls being spaced far enough apart to allow an ear of corn to pass rearwardly from the holder between them without contact therewith. The husking rolls are preferably made of or covered with rubber or analogous yielding material which will insure a firm hold on the husks and are secured to vertical shafts journaled at their opposite ends in suitable bearings $c^2 c^3$ on the table and bearing yoke of the frame. One roll of each pair is movable toward and from the other and is pressed yieldingly toward the latter by spring-pressed boxes $c^4$, Fig. 7, of any usual or suitable construction, and the rolls of each pair are geared together so as to rotate in opposite directions by intermeshing gear wheels $c^5 c^6$ at the opposite ends thereof. These gear wheels are of a sort adapted to allow considerable play of the movable roller away from the other without throwing the gear wheels out of mesh. The shaft of one roll of each pair is extended upwardly and connected by bevel gear wheels $d d'$ to a horizontal drive shaft E which is journaled in suitable bearings on the end uprights of the frame and driven in any suitable manner. By the described mechanism the rolls are driven in such direction that when the ends of the husks of the ear of corn are engaged between the rolls, they will feed the husks in opposite directions between them, thereby stripping them from the ear and pulling or moving the ear rearwardly out of the holder B. The husking rolls could be constructed, mounted and driven in any other usual or suitable way.

F F and F' F' represent two opposite pairs of stripping fingers or tongs arranged to reciprocate toward and from the ear of corn in the holder in a vertical plane, passing between the husking rolls crosswise of the ear of corn. The tongs are provided at their inner ends with sharpened hooks or prongs $f$ adapted, when the tongs are closed or pressed together, to grip or stick into the husk of the ear so as to pull or tear the husk open when the tongs are retracted or moved away from the ear.

G G' represent two tong slides or slide heads arranged on opposite sides of the husking rolls to reciprocate toward and from each other in suitable ways $g$ $g'$ in the table and bearing yoke of the frame. The tongs of each pair are pivoted at their outer ends by pins $h$, or otherwise, to one of said slide heads, and suitable springs I carried by the slide heads tend to close or force the tongs toward each other. Bowed springs are shown for this purpose, each secured at one end to the slide head and bearing at its free end against one of the fingers or tongs. Thumb screws $i$ passing through holes in the springs into screw holes in the slide head serve to regulate the pressure with which the tongs are closed together by the springs. Any other suitable kind of springs and adjusting means therefor can be employed for closing the tongs. The tongs reciprocate in slots $k$ in the table and bearing yoke of the frame, and each tong or finger is provided near its free end with oppositely extending rollers or projections $k'$ which coöperate with guide lugs $k^2$ and grooves $k^3$ in each of the opposite walls of the slots $k$ to open the tongs and hold them open or closed as necessary in the movements of the pairs of tongs toward and from each other. In the position of the tongs shown in Fig. 4 their rollers bear against the outer edges of the guide lugs $k^2$ and each pair of tongs is thereby held open. When the tongs are advanced by their slides far enough for their rollers to clear the inner ends of the guide lugs $k^2$, each pair of tongs will be closed onto the ear of corn by its springs I and as the slide heads are retracted the rollers $k'$ traveling against the inclined inner ends of the lugs $k^2$ will cause the hooks of each pair of fingers to gradually close together so as to follow around the sides of the ear and scrape the husks therefrom. The tongs will be held closed by their rollers traveling in the straight portions of the guide grooves $k^3$ in the continued return movements of the slide heads and their hooks will drag the ends of the husks with them between the husking rolls of the two opposite pairs. After the hook ends of the tongs pass between the rolls their guide rollers will travel through the inclined portions of the guide grooves $k^3$ and thereby open or spread the tongs. The guide rollers will pass out of the guide grooves before the finger or guides are completely retracted, and when the slide heads again advance the guide rollers will be caused to pass outside of the guide lugs $k^2$ and will be prevented from entering and moving inwardly through the guide grooves by suitable pivoted switch tongues $l$, Figs. 5 and 9, which are yieldingly held against the outer edges of the guide lugs $k^2$ with their free ends extending part way across the outlet ends of the grooves by suitable springs $l'$. The guide rollers can swing the switch tongues outwardly and pass out of the guide grooves, but the switch tongues will close the guide grooves against the entrance of the rollers in the inward or advance movements of the tongs. The tongs are thus held open while they advance, by the guide lugs and rollers, and when their hook ends are opposite the ear the rollers pass off of the lugs and the hooks are suddenly snapped together by their springs so as to penetrate the husks and take a firm hold thereof. The hooks retain their hold on the husks until they pass between the husking rolls and drag the ends of the husks between the rolls. When the hooks pass the centers of the rolls they will begin to open or spread, and as the husks will then be held by the rolls the hooks will readily disengage the husks. The tongs thus feed the husks to the husking rolls and the latter clear the husks from the hooks so that the husk and silk will not become entangled with the tongs and clog the machine.

The tong slides are reciprocated in the machine illustrated by rotary cams M M', Figs. 1 and 3, which engage rollers or projections $m$ $m'$ on the tong slides. The cams preferably have outwardly directed peripheral faces $m^2$ which bear against the rollers to advance or shove the slides inwardly, and inwardly directed faces $m^3$ which draw the rollers outwardly to retract the slides. The cams are preferably shaped to cause the tongs to advance slower than they are retracted, thereby allowing more time for the husking rolls to strip off the husks and for feeding the ears to the machine. The rollers are adjustably secured to the slides by slotted arms $n$ and screws $n'$ or otherwise to enable the proper adjustments of the two pairs of tongs relative to each other. The tong slides could be reciprocated by other suitable means.

The machine table is provided at opposite sides of the husking rolls with openings O O' partly surrounded by curbs or flanges *p* through which the husks discharge from the husking rolls, and scrapers *q* adjustably secured to the ends of the curbs and resting against the surfaces of the husking rolls serve to direct the husks and silk into the discharge openings and prevent the silk from winding around the rolls.

R, Fig. 3, indicates a discharge chute for the husked ears. As the husks are stripped from the ear the latter is pulled rearwardly out of the holder and falls into the discharge chute by which it can be directed into a suitable receptacle or conveyer for carrying the ears from the machine.

While the reciprocating tongs constitute efficient means for dividing and pulling the ends of the husks into the bite of the husking rolls, the described action of the two pairs of rolls in stripping the husks in opposite directions from the ear, and thus feeding the ear forwardly in the space between the pairs of rolls, is not dependent upon the particular means employed for directing the husks into the grasp of the rolls and other means could be used for this purpose.

I claim as my invention:

1. In a corn husking machine, the combination of husking rolls arranged in pairs with a space between the pairs of rolls to receive the ear of corn, means for drawing the husks into the bite of the rolls of each pair, and means for driving the pairs of rolls in opposite directions whereby they strip the husks in opposite directions away from the ear and move the ear forwardly endwise in the space between the pairs of rolls, substantially as set forth.

2. In a corn husking machine, the combination of husking rolls arranged in pairs with a space between the pairs of rolls for the passage of the ear of corn, means for drawing the husks into the bite of the rolls of each pair, means for driving the pairs of rolls whereby they strip the husks in opposite directions from the ear and move the ear forwardly endwise in said space between the pairs of rolls, and means for directing the ear of corn endwise into the space between the pairs of rolls, substantially as set forth.

3. In a corn husking machine, the combination of a holder in which the ear of corn is movable endwise, husking rolls arranged in pairs at opposite sides of the axial line of said holder and with their axes transversely with respect to said axial line, means for drawing the husks into the bite of the rolls of each pair, and means for driving the pairs of rolls in opposite directions whereby they strip the husks in opposite directions from the ear and move the ear forwardly endwise through said holder, substantially as set forth.

4. In a corn husking machine, the combination of a holder in which the ear of corn is movable endwise, means for dividing and pulling the ends of the husks in opposite directions from the ear and into the bite of the rolls, and driven husking rolls which grasp the ends of the husks and strip the husks in opposite directions away from the ear and move the ear forwardly endwise through said holder, substantially as set forth.

5. In a corn husking machine, the combination of a holder in which the ear of corn is movable endwise, driven husking rolls arranged to the side of the path of travel of the ear, means movable transversely of the direction of movement of the ear for drawing the ends of the husks into the bite of said rolls, and means for driving said rolls to grasp and strip the husks sidewise away from the ear and move the ear endwise past said rolls, substantially as set forth.

6. In a corn husking machine, the combination of driven husking rolls arranged in pairs with a space between the pairs of rolls for the passage of the ear of corn, means movable transversely of the plane of movement of the ear between the pairs of rolls for drawing the ends of the husks into the bite of said rolls, and means for driving said rolls to grasp and strip the husks sidewise away from the ear and move the ear endwise in the space between the pairs of rolls, substantially as set forth.

7. The combination of two pairs of husking rolls, means for holding an ear of corn in the space between said pairs of rolls, reciprocating stripping tongs which engage the husks, partially tear them from the ear and draw them into the bite of the husking rolls, and means for driving said rolls to strip the husks from the ear and pull the ear past the rolls, substantially as set forth.

8. The combination of husking rolls, means for holding an ear of corn, stripping tongs, means for advancing and closing said tongs on the ear and then retracting the tongs to partially strip the husks from the ear and engage the husks between said husking rolls, and means for driving said rolls to strip the husks from the ear, substantially as set forth.

9. The combination of husking rolls, means for holding an ear of corn, stripping tongs, means for advancing and closing said tongs on the ear and moving the tongs away from the ear toward the bite of the rolls whereby the husks are partially stripped from the ear and dragged between husking rolls, and means for driving said husking rolls to strip the husks from the ear, substantially as set forth.

10. The combination of two pairs of husking rolls, means for holding an ear of corn between said pairs of rolls, stripping tongs, means for reciprocating said tongs toward and from the ear, means for closing and opening said tongs to grasp and release the husks, and means for driving said rolls to strip the husks from the ear, substantially as set forth.

11. The combination of two pairs of husking rolls, means for holding an ear of corn between said pairs of rolls, slides arranged at opposite sides of said husking rolls, means for reciprocating said slides toward and from said rolls, a pair of movable stripping tongs connected to each slide, means for closing and opening said tongs to grasp and release the husks, and means for driving said rolls to strip the husks from the ear, substantially as set forth.

12. The combination of two pairs of husking rolls, means for holding an ear of corn between said pairs of rolls, slides arranged at opposite sides of said husking rolls, means for reciprocating said slides toward and from said rolls, a pair of stripping tongs pivoted to each slide, springs for pressing said tongs toward each other to grasp the husks, guide devices for spreading and holding said tongs apart against the action of said springs, and means for driving said rolls to strip the husks from the ear, substantially as set forth.

13. The combination of two pairs of husking rolls, means for holding an ear of corn between said pairs of rolls, slides arranged at opposite sides of said husking rolls, means for reciprocating said slides toward and from said rolls, a pair of stripping tongs pivoted to each slide, springs for pressing said tongs toward each other to grasp the husks, projections on said tongs, and guides against which said projections travel and which are shaped to hold said tongs together and then spread the same during their movement in one direction and to hold them apart until they reach the limit of their movement in the opposite direction, and means for driving said rolls to strip the husks from the ear, substantially as set forth.

14. The combination of two pairs of husking rolls, means for holding an ear of corn between said pairs of rolls, oppositely arranged pairs of stripping tongs provided with hook ends, means for opening and closing the tongs of each pair, means for moving the hook ends of said pairs of tongs in opposite directions between said husking rolls, and means for driving said husking rolls to strip the husks from the ear, substantially as set forth.

15. In a corn husking machine, the combination of rolls arranged in pairs on opposite sides of the line of feed of the ear through the machine and at an angle to such line, and means for driving the pairs of rolls in opposite directions to strip the husks in opposite directions away from the ear as the ear is moved endwise between the pairs of rolls, substantially as set forth.

Witness my hand, this 5th day of September, 1906.

JOHN F. WHITE.

Witnesses:
C. W. PARKER,
C. B. HORNBECK.